United States Patent
Vanderschaeghe et al.

[11] Patent Number: 5,621,295
[45] Date of Patent: Apr. 15, 1997

[54] DEVICE FOR DRIVING USING AN ELECTRIC MOTOR COMPRISING MEANS FOR MEASURING THE DISPLACEMENT OF THE DRIVEN BODY

[75] Inventors: Christian Vanderschaeghe, Cluses; Serge Bruno, Scionzier, both of France

[73] Assignee: SOMFY, France

[21] Appl. No.: 385,272

[22] Filed: Feb. 8, 1995

[30] Foreign Application Priority Data

Mar. 2, 1994 [FR] France ................................ 94 02397

[51] Int. Cl.$^6$ ................................ H02P 3/26; A47H 5/00
[52] U.S. Cl. .................. 318/753; 318/742; 318/785; 318/789; 318/795; 318/266; 318/286; 318/372; 318/468; 318/430
[58] Field of Search ..................... 318/739, 740, 318/741, 742, 744, 751, 753, 778, 781, 785, 789, 790, 794, 795, 266, 286, 370, 371, 372, 466, 467, 468, 430, 431; 160/1, 7, 331; 49/138, 322, 334, 340, 349

[56] References Cited

U.S. PATENT DOCUMENTS

| | | |
|---|---|---|
| 3,183,423 | 5/1965 | Manners . |
| 3,551,740 | 12/1970 | Manners . |
| 4,494,058 | 1/1985 | Berti ..................... 318/372 X |
| 4,614,903 | 9/1986 | Betsch et al. ................ 318/443 |
| 4,958,112 | 9/1990 | Zerillo ..................... 318/468 X |
| 4,999,551 | 3/1991 | Yoshida et al. ............. 318/286 |
| 5,170,108 | 12/1992 | Peterson et al. ........... 318/469 |

FOREIGN PATENT DOCUMENTS

| | | |
|---|---|---|
| 2671129 | 7/1992 | France . |
| 3803119 | 8/1989 | Germany . |

Primary Examiner—Bentsu Ro
Attorney, Agent, or Firm—Laff, Whitesel, Conte & Saret, Ltd.

[57] ABSTRACT

Device for driving a body by means of an electric motor, comprising mechanical means for measuring the displacement of said body which are kinematically linked to the body and are equipped with switches (ID, IM) actuated by the mechanical measurement means at certain points on the trajectory of the body. The device comprises means for initializing a phase for specific powering of the motor such as power supply at reduced torque for a timed duration (TP, x, C4) or power supply at reduced voltage or cut-off of the power supply, switched in by actuation of at least one of said switches.

7 Claims, 4 Drawing Sheets

DEVICE FOR DRIVING USING AN ELECTRIC MOTOR COMPRISING MEANS FOR MEASURING THE DISPLACEMENT OF THE DRIVEN BODY

FIELD OF THE INVENTION

The present invention relates to a device for driving a body by means of an electric motor, comprising mechanical means for measuring the displacement of said body which are kinematically linked to said body and are equipped with switches actuated by said means at certain points on the trajectory of said body.

PRIOR ART

In many cases, particularly in the case of motorized closure or sunscreen devices such as doors, shutters or blinds, the body comes into abutment in the open position and/or in the closed position, and it is generally important for the body to come perfectly in abutment at the end of travel. This is, for example, the case with blinds of the "cassette" type, in which the end of the fabric is connected to a closure section which, when the blind is completely rolled up, is applied to the box structure in order to close it and protect the rolled-up blind. On a line of shutters or blinds installed along the facade of a building, it is moreover desirable, for aesthetic reasons, for all the blinds or shutters to stop at the same height. In the case of these closure or sunscreen devices, the mechanical means for measuring the displacement generally consist of a counter device equipped with switches, generally two in number, cutting off the power supply of the motor when the product is in the completely retracted position or in the completely deployed position. This counter device can admittedly be set, but these controls do not, however, allow the product to be stopped equally and repetitively. Indeed, in use discrepancies are observed between the stopping points of several installations, and drifts over time are observed on one and the same installation. These discrepancies and drifts are due to running-in and wear on the constituent parts of the product itself, whose structure changes with time, weather conditions, for example wear which increases the spacing of the strips of a roller shutter and therefore its length, or rain which stretches a blind. The result is that on a line of shutters or blinds installed along a facade none of the shutters or of the blinds is stopped exactly at the same point or that a blind of the cassette type does not always close in the rolled-up position, which is not aesthetic and does not allow the cassette to protect the blind very well. Devices are known which are intended to remedy this fault, in which an elastic means is interposed in the transmission of the operating device. The counter device is set so that it interrupts the power supply of the motor beyond the desired stopping point, that is to say beyond the limit stop. The elastic means allow the motor to continue to rotate for a time after the limit stop is reached, that is to say sufficient time to absorb the discrepancies and drifts. Such devices are described in Patents FR 2,431,022 and EP 0,135,731. In the first of these documents, the elastic means is located between the motor and a fixed point, while in the second document the elastic means is located on the driving wheel of the motor. As the limit stops consist of fixed elements, the product driven therefore actually does always stop at the same point and repetitively, but these devices still have a significant drawback. Beyond the physical limit stop, the product is subjected to a tensile load which is necessarily greater than the load generated by the nominal torque developed by the motor and which, being repeated each time the blind is used, subjects the product to abnormal loadings and to fatigue which is prejudicial to its longevity. What is more, these devices can be used only in the case where the product driven prevents the motor from rotating when it is at the limit stop. These devices cannot therefore be used to stop a blind fabric in the unrolled position, for example.

Stopping devices are also known which comprise means for detecting an excess torque applied to the motor so as to cut off the power supply to this motor. The excess torque may be created by the product hitting the limit stop. These devices have the same drawbacks as the previous devices. An excess torque is necessary and has to be substantial to prevent the slightest amount of parasitic friction causing untimely stopping of the motor. As with the previous devices, they can be used only in the case where the product driven exerts a braking load on the motor, that is to say when tension is exerted on a fabric or when the product driven is sufficiently rigid that when opposed by a limit stop, it can transmit the force necessary to create sufficient excess torque.

SUMMARY OF THE INVENTION

The main object of the present invention is to counter the drawbacks of the known devices, that is to say to provide in a reliable and repetitive fashion the stopping of the driven body against a limit stop without excessive stressing of the driven body.

The device according to the invention is one which comprises means for initializing a particular power-supply phase for the motor switched in by actuation of one or other of the switches of the mechanical means for measuring the displacement of the driven body.

The particular way in which the motor is powered may consist in powering the motor, for a timed duration, at a reduced voltage or torque or consist in cutting off the power supply. Powering at reduced torque is achieved by reducing the voltage on the auxiliary phase of the motor and powering at reduced voltage is achieved by reducing the voltage on both phases.

In the case of a body such as a door, a shutter or a blind, the mechanical means for measuring the displacement of the body will be set so that the stopping point determined by actuating one of the switches is situated before the limit stop, a sufficient distance away to absorb the discrepancies due to inaccuracies in setting, drifts and other variations, the body continuing to travel, during the phase in which the motor is powered in a specific way, until it hits the limit stop.

In the case of powering at reduced torque or at reduced voltage, the timed period is such that the body definitely comes up against the limit stop, but without generating a dangerous excess torque.

The timed period may be replaced by a device for detecting that the rotor has become blocked, which has the effect of instantaneously cutting off the power supply of the motor.

A phase with a specific type of power supply consisting in cutting off the power supply can be used in all cases where the force of gravity or force of inertia of the driven body is sufficient to drive this body as far as the limit stop.

Reduced stressing of the driven body for stopping it also signifies reduced stressing of the limit stop. Now, such a limit stop may be formed accidentally by a human body or by part of a human body. A consequential result of the invention is therefore to ensure user-safety. For this purpose, the mechanical means for measuring the displacement of the driven body can be set so that at least one of its switches is actuated before the difference between the maximum load that the motor can supply and the load resisting the advancement of the body, that is to say the available load margin, reaches a given value.

If said given value is equal to the standardized immobilization force which has to be exerted in order to stop a body such as a door used to close an opening, or a gate, the device according to the invention makes it possible to dispense with any other safety device. In general, the variations in the available load margin during the displacement of the door or of the gate are such that with a single point at which the motor torque is reduced it is possible, throughout the displacement of the door or of the gate, to keep the available load margin within a range of values which are less than the value stipulated in the standards. Upon start-up, that is to say at the beginning of opening or closing, the available torque is the nominal torque of the motor. In practice, it is necessary to overcome the significant resistive load on start-up. As the motor torque and resistive torque are both substantial, the available load margin remains lower than the standard. Then, with the resistive load decreasing, the available load margin increases, but the stopping point, determined by the mechanical means for measuring the displacement of the door, is reached before the available load margin exceeds the standardized value. If the door is not immobilized, the reduced torque is sufficient to drive the door as far as its limit stop. Interruption of the power supply of the motor can be provided by a timer or by detection that the rotor has been blocked. Cutting off the power supply of the motor at the stopping point may even be envisaged in the case where the force of gravity and/or the inertia of the door is sufficient to ensure that the door travels as far as its limit stop.

The above considerations lead one to consider the use of flexible or retractable limit stops with limited resistance, so that they are capable of stopping the moving body when it is driven at reduced torque or by gravity or inertia, but which retract when the motor starts up again at its nominal torque. Such limit stops would make it possible to stop the body at intermediate points.

The device according to the invention is also applicable to an installation which does not have a limit stop. The particular phase can precede natural stoppage through friction, that is to say precede a slowing-down phase followed by stoppage on a free trajectory, with no limit stop.

BRIEF DESCRIPTION OF THE DRAWINGS

A number of embodiments of the invention will be described below with reference to the appended drawing in which.

DESCRIPTION OF THE PREFERRED EMBODIMENTS

Figure 1:
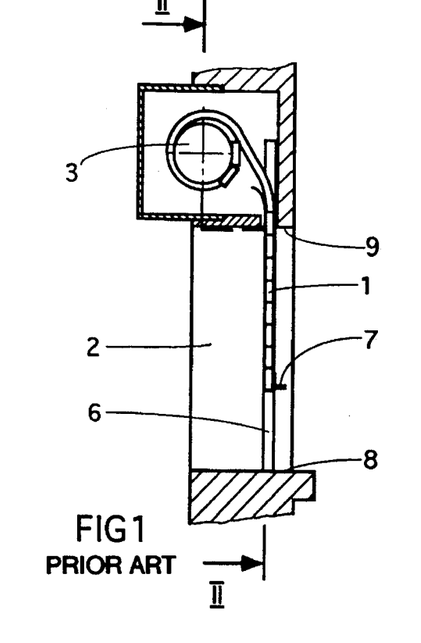
FIG. 1 is a section on I—I of FIG. 2, of a conventional roller shutter mounted in a reveal.
Figure 2:
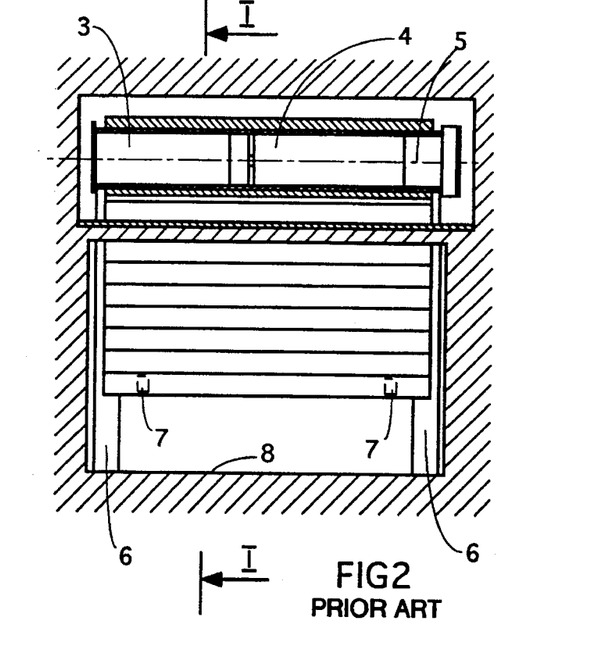
FIG. 2 is a section on II—II of FIG. 1.

Represented by way of example in FIGS. 1 and 2 is a roller shutter 1 intended to close a reveal 2. This roller shutter is rolled around a roller tube 3 driven in a known manner by a tubular motor 4 mounted inside the tube 3. The tubular motor 4 is associated with a counter device 5 as described, for example, in French Patent 2,525,832 or in the Patents FR 2,455,695 and 2,455,349. This counter device 5 is driven by the motor and comprises two switches, one for each direction of rotation, which are actuated after a certain number of revolutions of the motor. Such a roller tube/ tubular motor is described, for example, in the Patents FR 2,480,846 and 2,376,285. The roller shutter 1 is divided laterally by two slideways 6 and its last strip has two stopping brackets 7 intended to come into abutment against the lower edge 8 and the upper edge 9 of the reveal. It is desirable that when the roller shutter is completely closed, the brackets 7 should effectively be in abutment against the lower edge 8 of the reveal and that when it is completely open the brackets 7 should be in abutment against the upper edge 9 of the reveal.

Figure 3:
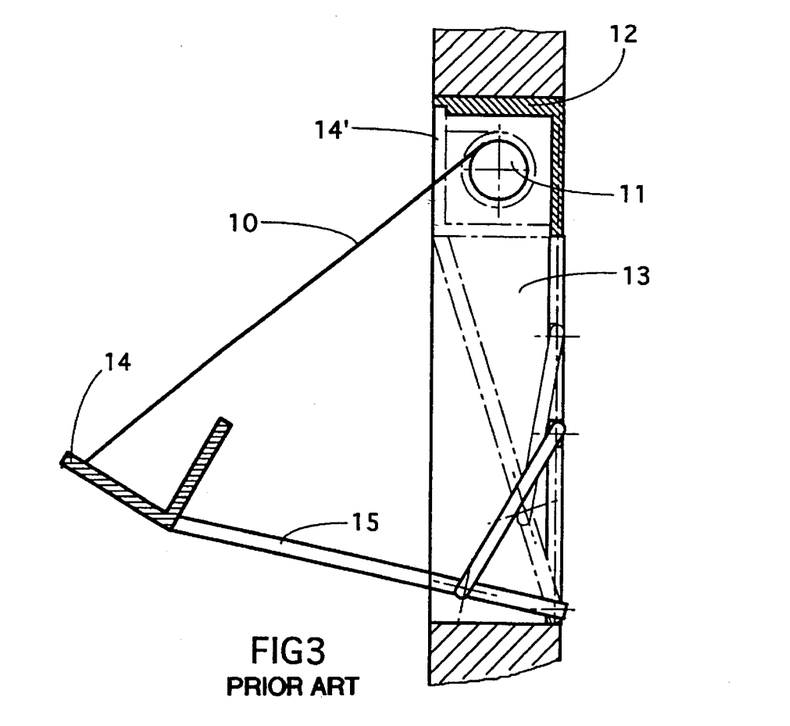
FIG. 3 represents, in section, a blind of the "cassette" type represented in the opened position and in the closed position.

The blind of the "cassette" type which is represented in FIG. 3 comprises a fabric 10 which can be rolled up on to a roller tube 11 similar to the tube 3 and accommodated in a box structure 12 fixed into the reveal 13. The end of the fabric 10 is attached to an L-shaped piece 14 itself fixed to the end of two arms 15 articulated to the bottom of the reveal 13, on each side of it. As the fabric 10 is rolled up, the shaped piece 14 comes and closes the box structure 12 as represented at 14'. This closure is guaranteed only if the piece 14 is applied perfectly against the fixed part of the box structure 12.

Figure 4:
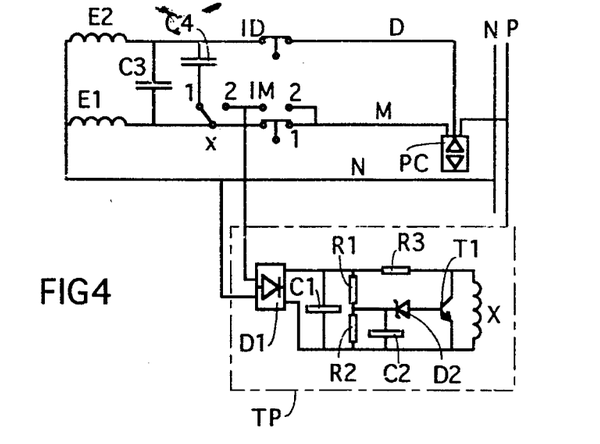
FIG. 4 represents a diagram for powering a blind as represented in FIGS. 1 to 3 at reduced torque for a timed duration.

Perfect closure of the box structure 12 is guaranteed by the means represented in FIG. 4. The electric motor 4 (according to FIGS. 1 and 2) is a single-phase asynchronous motor with a phase-shifting capacitor. It is represented by its main winding E1 and its auxiliary winding E2 and here comprises two phase-shifting capacitors C3 and C4, it being possible for the capacitor C4 to be connected up in parallel to C3 by means of a contact x. The capacitance of C3+C4 is calculated to allow the motor to rotate at nominal torque. When just C3 is connected up, the motor rotates at reduced torque.

The counter device 5 comprises two counter units (as described in the patents mentioned above) linked kinematically to the roller tube 3. The switch of the counter unit working on the way up is replaced by a reverser IM which is actuated when the blind, on its way up, reaches a position which has been stored in memory within the counter unit, this position corresponding to a position of the profile section 14 before it comes into abutment against the box structure 12. The other counting unit, monitoring the coming-down of the blind, is equipped with a conventional switch ID. One of the terminals of the reverser IM, common to the contacts 1 and 2, is electrically connected to the self-powered terminal corresponding to the "up direction" of a control point PC whereas one of the terminals of the switches ID is electrically connected to the self-powered terminal corresponding to the "down direction" button of this control point PC. P and N conventionally denote the phase and the neutral of a single-phase power supply. In order to make the diagram easier to read, M has been used to denote the wire connected to the up-direction button and D has been used to denote the wire connected to the down-direction button. The other terminal of the switch ID is connected to the auxiliary winding E2 and the other terminal of the reverser IM is connected, via the common point of a reversing contact x which can flip from a position 1 to a position 2, to the main winding E1 of the motor. The terminal 2 of the reversing contact x is connected to one of the terminals of the reverser IM.

This device further comprises a timer module TP comprising a rectifier consisting of a diode bridge D1 and of a smoothing capacitor C1 and connected up to the common point of the terminals of x and of IM, a voltage divider R1, R2, a load capacitor C2 connected up in parallel with the resistor R2, a resistor R3 in series with a relay X and a transistor T1 connected up in parallel with the relay X, the base of the transistor T1 being connected to the midpoint of the voltage divider R1, R2 via a Zener diode D2. R3 limits the current in the relay X and in the transistor T1. When the timer module is switched on, the AC voltage is rectified via the diode bridge D1 and C1 and the capacitor C2 charges up progressively through R1. The Zener diode D2 remains blocked until the charge in C2 is sufficient for the Zener voltage to appear on its terminals. For as long as the Zener diode D2 is blocked, the transistor T1 is blocked and the relay X is powered with sufficient voltage to operate the contact x. When the Zener voltage is reached, the Zener diode D2 becomes conducting. The base of the transistor T1 is then powered and T1 conducts, short-circuiting the relay X. The contact x is then released. The charge time for C2 is calculated to be a bit longer than the time necessary for the blind to travel from the top stopping point in memory to the limit stop.

This timer module could be replaced by any timer module of known analog or monostable type.

The device represented operates as follows: the second counting unit memorizes the "blind unrolled" stopping point. It is set to activate the switch ID when the blind is at the desired unrolled position.

The first counting unit memorizes the "blind retracted" stopping point and it is set to activate the reverser IM some time before the closure profile section 14 comes into abutment on the box structure 12, this period of time being shorter than that given by the timer module.

Let us assume that the blind is completely unrolled. The counter device is at the "blind unrolled" stopping point and the switch ID is open. IM is closed in position 1 and the contact x is at rest in position 1. When the "up" button of the control point PC is activated, the phase P is connected directly to the winding E1 of the motor and via the capacitors C3+C4 to the winding E2. The motor can then provide its nominal torque. The blind rolls up. As the counter device has left the bottom point which it holds in memory, the switch ID closes again. When the blind arrives at the top stopping point hold in memory, the counting unit activates the reverser IM and its contact switches from position 1 to position 2. The capacitor C4 is switched out of the circuit and the auxiliary winding E2 is powered solely via the capacitor C3. The motor provides a reduced torque. At the same time, the capacitor C2 charges up. The blind rolls up at reduced torque and the profile closure section 14 comes into abutment to close the box section 12. When the capacitor C2 has charged up, the Zener diode D2 conducts, the transistor T1 conducts and the contact x trips into position 1. The motor is no longer powered.

The diagram represented in FIG. 4 can be used as it is to control the roller shutter represented in FIGS. 1 and 2, that is to say to ensure that the brackets 7 definitely come into abutment against the upper edge 9 of the reveal.

Figure 5:
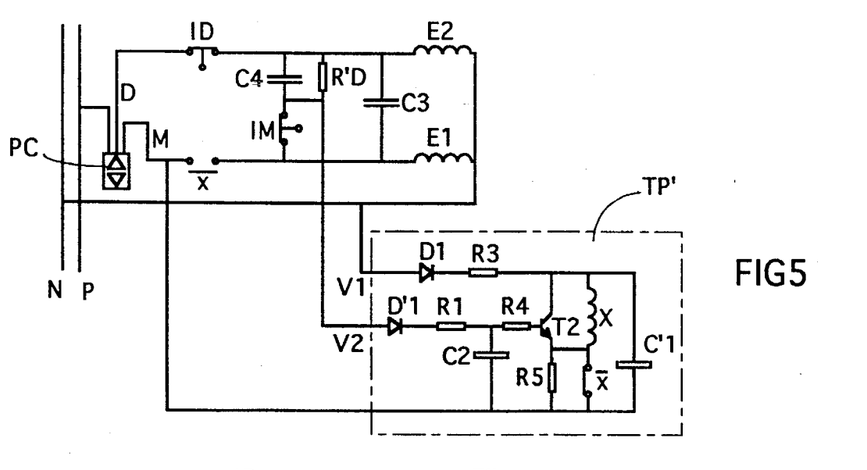
FIG. 5 represents a second embodiment of a diagram for powering at reduced torque for a timed duration.

FIG. 5 represents a second embodiment in which the timing is triggered in a different way. Two advantages of this alternative over the previous embodiment lie in the fact that the reverser IM is replaced by a simple switch, which makes it possible to use standard counting devices, and in the fact that the device can operate with a control with sustained action without the timer module TP' remaining powered. Other advantages will emerge from the description of this embodiment.

The timer module TP' comprises a first diode D1, the anode of which is connected to the neutral N of the mains and a second diode D'1 whose anode is connected to a resistor R'D mounted in parallel with the phase shifting capacitor C4. The diode D1 is in series with a current-limiting resistor R3 itself in series with a transistor T2 whose emitter is connected to the wire M through a resistor R5. The diode D'1 is connected to the base of the transistor T2 through two resistors R1 and R4, the common point of which is connected to the electrolytic capacitor C2. Between the collector and the emitter of the transistor T2 there is connected up a relay X, one of the terminals of which is connected to the "up" wire M through a rest contact $\bar{x}$ and a resistor R5 parallel to the contact $\bar{x}$ and the other terminal is connected to the neutral of the mains through the resistor R3 of the diode D1. An electrolytic capacitor C'1 is furthermore connected up in parallel with the relay X and with its rest contact $\bar{x}$.

The switch IM is in series with the capacitor C4 and a working contact x of the relay X intended to connect two terminals of the "up" wire M.

The operation of the device represented in FIG. 5 is as follows: when the "up" button is activated at the control point PC, a voltage V1 causes the relay X to be powered through the diode D1 and the resistor R3, initially at a high voltage, then at a reduced voltage, through the resistor R5 after the rest contact $\bar{x}$ has been opened. To within the base-emitter voltage, the conducting threshold of the transistor T2 then becomes $V1 \times R5/(R5+X+R3)$, X representing the value of the resistance of the relay X. The value of the conducting threshold is fixed between 5 and 10 V, for example by selecting R5. The function of R3 is to limit the current through the transistor T2. With the contact x closed, the main winding E1 is powered directly and, as the switch IM is closed, the auxiliary winding E2 is powered through (C3+C4). The motor supplies its nominal torque.

When the blind gets to the memorized top stopping point, the counter unit opens the switch IM and the winding E2 is then powered only through the capacitor C3. The motor supplies a reduced torque and the blind continues to roll up, then hits the limit stop as in the previous case.

The effect of opening the switch IM is to cause a voltage V2 to appear on the terminal of the switch IM connected to the capacitor C4. The capacitor C2 then charges up progressively through R1 and the diode D'1. When the voltage at the terminals of the capacitor C2 reaches the voltage at the terminals of the resistor R5 increased by the conduction threshold of the transistor T2, then this transistor T2 conducts, short-circuiting the relay X, whose armature trips. Its rest contact $\bar{x}$ closes again, allowing the capacitor C2 to discharge. The voltage at its terminals falls to approximately 0.6 V. The transistor T2 is kept in the conducting state via the diode D'1 and the resistors R'D, R1 and R4, R'D having the function of allowing the supply current to pass to the base of the transistor T2 once the switch IM has been opened. R4 serves to limit the strength of the current through the resistor while the capacitor C2 is discharging. With the tripping of the relay X, the contact x opens, cutting off the power supply to the motor. The system is then ready to start again with the capacitor C2 discharged.

In the event of the mains voltage varying, the voltages V1 and V2 vary together. As these voltages play a part in the two terms of the comparison, the device is relatively insensitive to variations in the mains voltage.

In general, this last embodiment offers several advantages which are the use of microcontacts which are simple and have cut/open performance which is intrinsically better than those of an inexpensive relay which does not fulfill this function well in a capacitive power loop, better pull-in/drop-out of the relay, through a positive reaction, a timed duration which is practically independent of the mains voltage and an immediate resetting of the timer through discharge of the capacitor C2, allowing consecutive uses.

Figure 6:
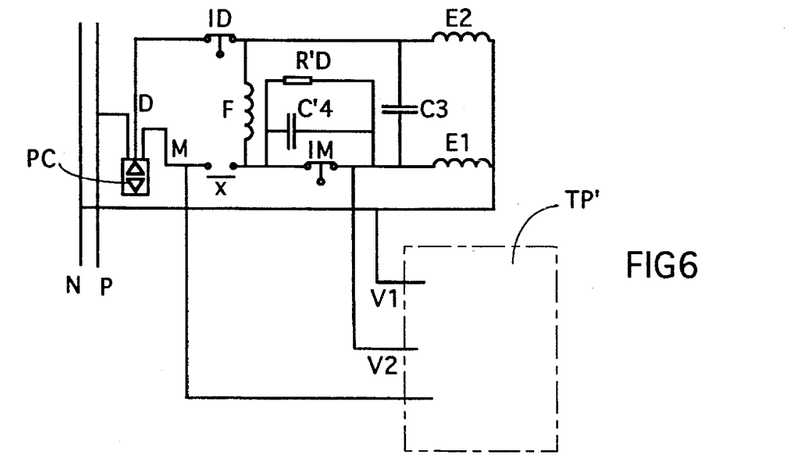
FIG. 6 represents an alternative of the second embodiment, with an electric brake.

FIG. 6 represents an alternative embodiment of the embodiment according to FIG. 5. This alternative differs from the previous one in that the switch IM, the capacitor C4 and the resistor R'D are arranged in parallel between the two windings E1 and E2 of the motor and the "up" wire, so that the motor is powered at reduced voltage after the switch IM has been opened. This alternative is furthermore equipped with an electric brake F which in the absence of current becomes blocking. The rest of the operation of this alternative is identical to the embodiment represented in FIG. 5.

Figure 7:
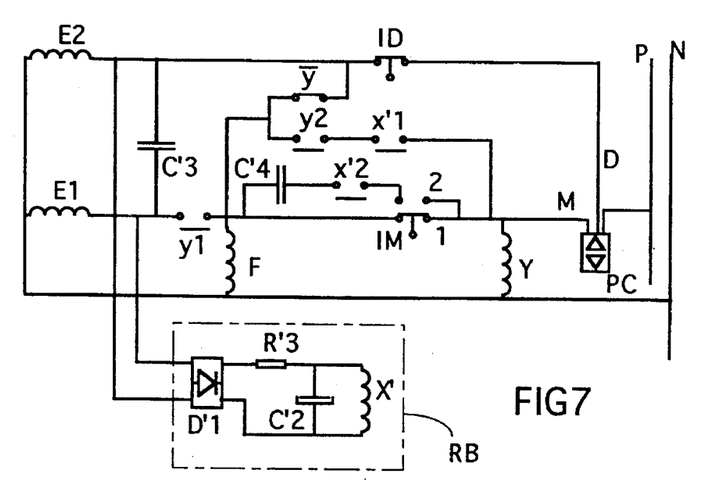
FIG. 7 represents a diagram for powering the motor with reduced voltage and detecting that the rotor is blocked.

As was seen above, it is also possible to power the motor at reduced voltage from the stopping point onwards. In this case it is beneficial to use a module for detecting that the rotor has become blocked, instead of a timer module. One embodiment is represented in FIG. 7.

In this embodiment, the phase-shifting capacitor C'3 is dimensioned so that the motor rotates at its nominal torque when this capacitor is in circuit. The capacitor C4 is here replaced by capacitor C'4 which can be introduced onto the "up" wire M.

The device comprises a module RB for detecting that the rotor has become blocked, this module consisting of a diode bridge D'1, a current-limiting resistor R'3, a smoothing capacitor C'2 and a relay X'. The diode bridge D'1 is connected up to the terminals of the phase-shifting capacitor C'3.

The device further comprises an electromagnetic brake F operating through lack of current and a relay Y connected to the "up" wire M.

The relay X' includes two working contacts x'1 and x'2. The relay Y includes two working contacts y1 and y2 and a rest contact $\bar{y}$.

This device operates as follows: when the "up" button is actuated at the control point PC, the relay Y is powered and its contacts change state. The main winding E1 of the motor is connected directly to the phase P and the auxiliary winding E2 is connected to the phase by the capacitor C'3. The motor produces its nominal torque. Since a voltage exists at the terminals of the capacitor C'3, the module RB for detecting that the rotor is blocked is powered and the relay X' is energized. Its contacts change state and the brake F is powered through the contacts x'1 and y2.

When the blind reaches its stopping point, in theory its top stopping point, the reverser IM changes from position 1 to postion 2. The winding E1 is then powered through the capacitor C'4 and the contacts x'2 and y1. The capacitor C'4 gives rise to a voltage drop on the windings of the motor and the motor is therefore powered at reduced voltage.

When the blind, driven by a reduced force, arrives against the limit stop, the rotor of the motor is blocked, which has the effect of causing a significant drop in voltage at the terminals of the phase-shifting capacitor C'3. The voltage drop on the diode bridge D'1 leads to the tripping of the relay X'. The contacts x trip so that the windings of the motor are no longer powered. The brake F, previously powered through the contacts x'1 and y2, is no longer powered and brakes.

In applications where it is possible to use the self weight of the driven body or its inertia, it is possible simply to cut off the power supply to the motor once the driven body has reached the memorized stopping point. This is the case, for example, with swing doors. Once the memorized bottom stopping point has been reached, the door continues in a sort of "freewheeling" mode.

Figure 8:
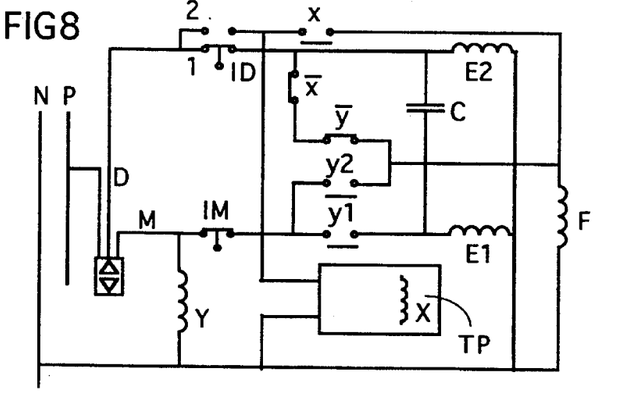
FIG. 8 represents a diagram for cutting off the power supply and actuating a brake after a time delay.

One embodiment of the corresponding control diagram is represented in FIG. 8. In this case, it is the switch of the "down" counter unit which is replaced by a reverser ID. The device comprises a timer module TP similar to that of FIG. 4 and an auxiliary relay Y connected up as in the previous case to the "up" wire. The device also comprises a brake F operating through lack of current. The motor is of standard type.

The operation of this device is as follows: with the door in the up position, if the user actuates the "down" button at the control point, the auxiliary winding E2 of the motor is powered directly through the reverser ID not actuated, whilst the main winding E1 is powered through the phase-shifting capacitor C. The brake F is powered through ID and the contacts $\bar{x}$ and $\bar{y}$. The motor rotates at reduced torque and the door is driven. When the memorized bottom point is reached, the reverser ID is actuated and the power supply to the motor is interrupted. When the reverser ID has changed to position 2, the timer module TP is then powered and the relay X is energized. The brake F is therefore powered by the reverser ID and the contact x. The door can therefore continue coming down "by freewheeling" until it hits its limit stop. After a timed period t, of sufficient duration for the door definitely to reach its limit stop, the relay X is short-circuited and its armature trips. The brake F is then no longer powered and brakes.

For going up, when the user actuates the "up" button, the relay Y is powered and its contacts change state. The main winding E1 of the motor is powered directly and the motor turns at its nominal torque. The brake F is powered through the contact y2. When the top stopping point is reached, the counter unit opens the switch IM, which has the effect of simultaneously cutting off the power supply of the motor and that of the brake, so that the door stops at the memorized stopping point.

Figure 9:
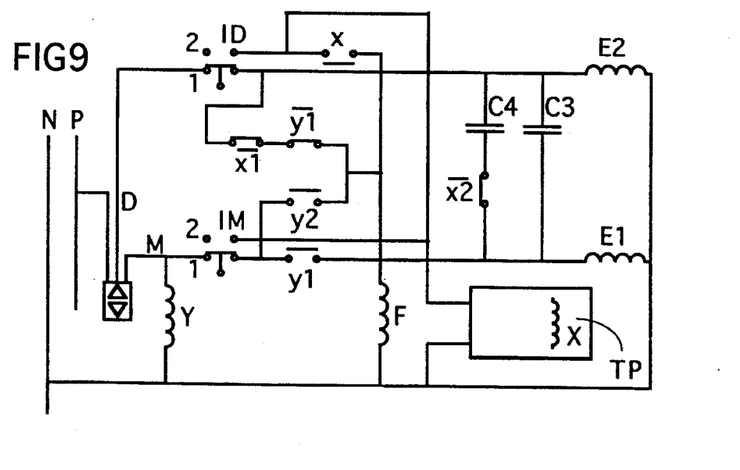
FIG. 9 represents a diagram for the timed powering at reduced torque on the way up and cutting off the power supply for a timed duration on the way down.

It is possible simultaneously to have "freewheeling" descent with timed braking, as has just been described, and upwards movement with a final phase at reduced torque for a timed duration. The diagram bringing these two possibilities together is represented in FIG. 9. This diagram is a combination of the diagrams represented in FIGS. 4 and 8. As in the case of FIG. 4, the phase-shifting of the phases of the motor is obtained by a first capacitor C3 and a second capacitor C4 in parallel with C3, switched out of the circuit by the relay X of the timer module TP. The two up and down counter units are equipped with reversers IM and ID, respectively. An auxiliary relay Y powered on the way up and a brake F capable of being switched into the circuit in parallel with the motor are seen again here.

The operation of this diagram is as follows: with the door in the top position, if the user actuates the "down" button at the control point, the auxiliary winding E2 of the motor is connected directly to phase by the reverser ID in the rest position, while the main winding E1 is connected to phase through the capacitors C3 and C4 in parallel. When the memorized bottom stopping point is reached, the reverser ID switches to position 2 which has the effect of cutting off the power supply of the motor and powering the relay X of the timer module TP. The brake F, first of all powered through ID, $\bar{x}1$ and $\bar{y}1$, is then powered through the contact x. The door comes down "in freewheel mode" until it hits the limit stop. Next, after the timed period, the relay X trips, which has the effect of cutting off the power supply to the brake which brakes.

With the door in the closed (bottom) position, if the user actuates the "up" button at the control point, the relay Y is energized and its contacts y1 and y2 close. The main winding E1 is then powered directly through IM and y1, whilst via the same route the auxiliary winding E2 is powered through the two capacitors C3 and C4, the contact $\bar{x}2$ being closed. The motor then rotates at its nominal torque.

When the memorized top point is reached, the reverser IM switches to position 2, which has the effect of powering the timer module TP. The relay X attracts and its contacts change state. The motor is therefore powered through IM in position 2 and the contacts x, y2 and y1. As the capacitor C4 has been switched out of circuit by the opening of the contact $\bar{x}2$, the motor rotates at reduced torque. When the timed period has elapsed, the relay X trips. The opening of the contact x simultaneously cuts off the power supply to the motor and to the brake F.

Figure 10:
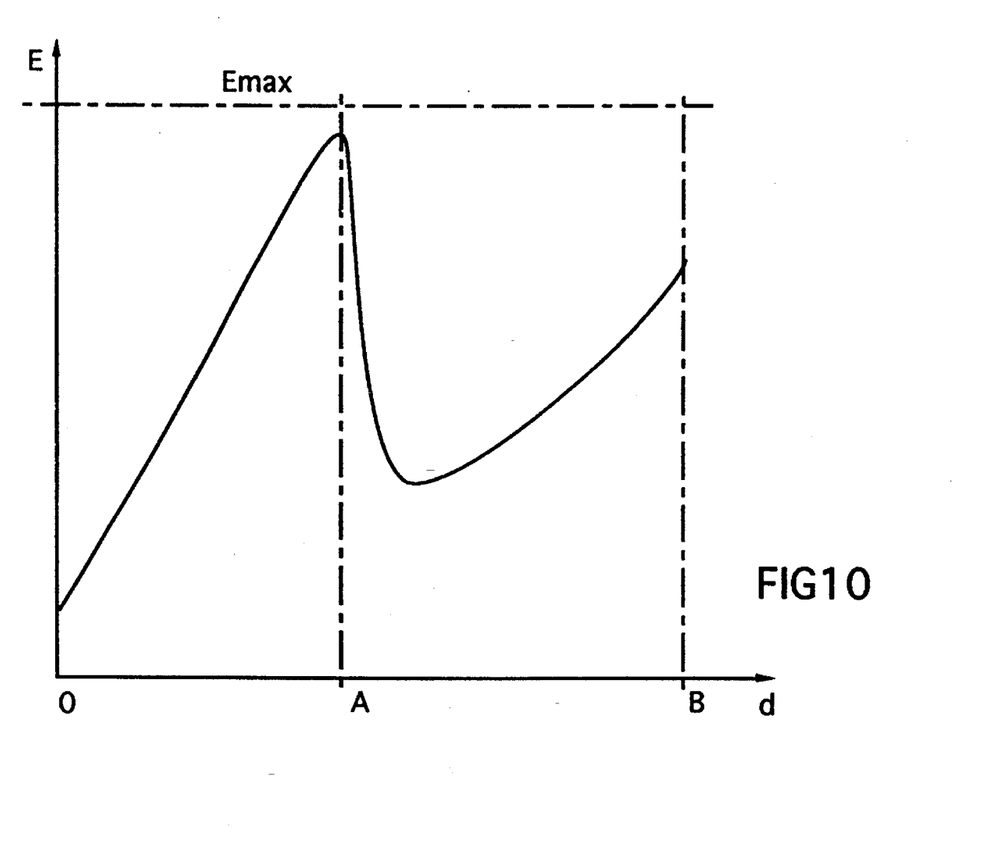
FIG. 10 represents the development of the available load margin in the case of the device being applied by way of a safety device.

FIG. 10 illustrates, in the form of a diagram, one use of the device by way of a safety device. This diagram represents the approximate development of the available load margin E as a function of the distance d travelled by a driven body, for example a door or a gate. Upon start-up, for example at the beginning of opening the door (point zero), the available torque is the nominal torque of the motor. The resistance of the door is substantial and the load margin available for stopping the door is low. Next, the door's resistance to movement decreases and the available load margin increases, but before it reaches the maximum acceptable load margin Emax, the mechanical means for measuring the displacement of the door cause the motor to be powered at reduced torque. The available load margin drops abruptly, but if the door is not blocked at this instant, it continues to be driven at reduced torque and the available load margin remains substantially below the maximum acceptable load margin, for example according to the development represented, until the door hits the limit stop (B), that is to say until the door reaches the closed position.

We claim:

1. A device for driving a body (1; 14) by means of an electric motor comprising mechanical means (5) for measuring the displacement of said body which are kinematically linked to said body and are equipped with switches (ID, IM) actuated by said mechanical measurement means at certain points on the trajectory of said body, which device comprises means for initializing a particular power-supply phase for the motor switched in by actuation of at least one of said switches (ID, IM), said initialization means has means for powering the motor with reduced voltage (RB, x'2, C'4), the device further comprising means (RB) for detecting that the rotor of the motor is blocked, said means for powering and said means (RB) for detecting that the rotor of the motor is blocked, cutting off the power supply of the motor when such a blockage is detected, and the motor is a single-phase asynchronous motor with a phase-shifting capacitor, wherein the means for detecting that the rotor is blocked consist of a relay (X') powered, via a rectifier circuit, by a voltage taken from the terminals of the phase-shifting capacitor (C'3) of the motor.

2. A device for driving a body (1; 14) by means of an electric motor, comprising mechanical means (5) for measuring the displacement of said body which are kinematically linked to said body and are equipped with switches (ID, IM) actuated by said mechanical measurement means at certain points of the trajectory of said body, which device comprises means for initializing a particular power-supply phase for the motor switched in by actuation of at least one of said switches (ID, IM), and wherein said body is driven up and down and the mechanical displacement measuring means are equipped with a switch corresponding to a top stopping point and with a switch corresponding to a bottom stopping point, and further comprise a brake (F) operating through lack of current, wherein said switches consist of reversers (IM, ID), and wherein the initialization means comprise means for supplying power to the motor at reduced torque for a timed period, said supplying means being activated by the top stopping point reverser (IM) and means for instantaneously cutting off the power supply of the motor and for the timed cutting-off of the power supply of the brake which are activated by the bottom stopping point reverser (ID).

3. The device as claimed in claim 2, which comprises a timer means (TP) comprising a relay (X) which is energized during the timed period so as to maintain the power supply of the brake (F) during the timed period, by means of one of its contacts (x).

4. The device as claimed in claim 2, which comprises a timer circuit (TP) comprising a relay (X) which is energized during the timed period and which, by means of its contacts, powers the motor at reduced torque on the way up and powers the brake (F) during the timed period, and a second relay (Y) which is energized on the way up and which, on its way up, by means of its contacts, powers the brake (F) and powers the motor at nominal torque until the top stopping point switch (IM) is actuated, that is to say before the timed period is initialized.

5. A device for driving a body between a bottom point and a top limit stop, by means of an electric motor, comprising mechanical means (5) for measuring the displacement of said body, said mechanical means are kinematically linked to said body and are equipped with switches (ID, IM) actuated by said mechanical means at certain points on the trajectory of said body, wherein one of said switches is a reverser (IM) actuated before, on its way up, comes against the top limit stop, the device comprising a timer circuit (TP) which is powered by said reverser (IM), said device further has means for initializing a particular power-supply phase for the motor switched in by actuation of at least one of said switches (ID, IM) and said initialization means has means for powering the motor at reduced torque for a timed duration (TP, x, C4, FIG. 4; TP', x, C3, FIG. 5).

6. A device for driving a body between a bottom point and a top limit stop, by means of an electric motor, comprising mechanical means (5) for measuring the displacement of said body, said mechanical means are kinematically linked to said body and are equipped with switches (ID, IM) actuated by said mechanical means at certain points on the trajectory of said body, wherein the mechanical means are set so that, on the way up, one of the switches (IM) is actuated before the body hits the top limit stop, the device comprising an electronic timing means (TP') powered by actuation of a "upp" operating button and triggered by said one switch (IM) so as to initialize the timing, said device further has means for initializing a particular power-supply phase for the motor switched in by actuation of at least one of said switches (ID, IM), and reduced torque for a timed duration (TP, x, C4, FIG. 4; TP', x, C3, FIG. 5).

7. The device as claimed in claim 6, for driving the body between the bottom point and the top limit stop and vice versa or horizontally between an open position and a closed position, and which further comprises a relay (Y) which is energized on the way up and which, by means of its contacts, powers a brake (F) and the motor on the way up, or respectively on opening.

* * * * *

UNITED STATES PATENT AND TRADEMARK OFFICE
CERTIFICATE OF CORRECTION

PATENT NO. : 5,621,295
DATED : April 15, 1997
INVENTOR(S) : Vanderschaeghe, et al.

It is certified that error appears in the above-indentified patent and that said Letters Patent is hereby corrected as shown below:

Col. 12, line 1, change "upp" to "up";

Col. 12, line 5, change "(ID, IM), and reduced" to "(ID, IM), and said initialization means has means for powering the motor at a reduced".

Signed and Sealed this

First Day of July, 1997

*Attest:*

BRUCE LEHMAN

*Attesting Officer*  Commissioner of Patents and Trademarks